United States Patent [19]
Arataki

[11] Patent Number: 5,825,732
[45] Date of Patent: Oct. 20, 1998

[54] ROTATION CONTROL CIRCUIT BASED ON THE MEAN VALUE OF RUN LENGTH CODE GENERATION PATTERNS REPRODUCING APPARATUS EQUIPPED WITH THE ROTATION CONTROL CIRCUIT

[75] Inventor: Yuji Arataki, Tokyo, Japan

[73] Assignee: Sony Corporation, Tokyo, Japan

[21] Appl. No.: 565,059

[22] Filed: Nov. 30, 1995

[30] Foreign Application Priority Data

Dec. 7, 1994 [JP] Japan .................................... 6-330382

[51] Int. Cl.$^6$ .................................................. G11B 19/247
[52] U.S. Cl. ........................................ 369/50; 360/73.03
[58] Field of Search ................................. 369/50, 58, 47, 369/48, 54; 360/73.03

[56] References Cited

U.S. PATENT DOCUMENTS

| | | | |
|---|---|---|---|
| 4,338,683 | 7/1982 | Furukawa | 369/50 |
| 4,386,300 | 5/1983 | Ogawa | 369/50 |
| 4,397,011 | 8/1983 | Ogawa | 369/50 |
| 4,908,810 | 3/1990 | Oie | 369/50 |
| 5,270,992 | 12/1993 | Yasuda et al. | |

FOREIGN PATENT DOCUMENTS

| | | |
|---|---|---|
| 0 049 136 | 4/1982 | European Pat. Off. . |
| 0 203 786 | 12/1986 | European Pat. Off. . |

Primary Examiner—Thang V. Tran
Attorney, Agent, or Firm—Limbach & Limbach L.L.P.

[57] ABSTRACT

Disclosed are a rotation servo circuit and a reproducing apparatus equipped therewith. In the rotation servo circuit, the average value of an inversion probability pattern of a run length code recorded on a recording medium is calculated in advance and, on the basis of the average value thus obtained, a reference rotation voltage is generated, so that a rotation in accordance with the reference rotation voltage is effected whenever a reference number of revolutions is deviated from.

19 Claims, 5 Drawing Sheets

FIG. 4

| DATA | EFM DATA | NUMBER OF INVERSIONS | DATA | EFM DATA | NUMBER OF INVERSIONS | DATA | EFM DATA | NUMBER OF INVERSIONS | DATA | EFM DATA | NUMBER OF INVERSIONS |
|---|---|---|---|---|---|---|---|---|---|---|---|
| 0 | 01001000100000 | 3 | 20 | 00000000100000 | 1 | 40 | 01001000100100 | 4 | 60 | 01001000100010 | 4 |
| 1 | 10000100000000 | 2 | 21 | 10000100001000 | 3 | 41 | 10000100100100 | 4 | 61 | 10000100100010 | 1 |
| 2 | 10010000100000 | 3 | 22 | 00001000100000 | 2 | 42 | 10010000100100 | 4 | 62 | 10010000100010 | 4 |
| 3 | 10001000100000 | 3 | 23 | 00100100100000 | 3 | 43 | 10001000100100 | 4 | 63 | 10001000100010 | 4 |
| 4 | 01000100000000 | 2 | 24 | 01000100001000 | 3 | 44 | 01000100100100 | 4 | 64 | 01000100100010 | 4 |
| 5 | 00000100010000 | 2 | 25 | 00000100001000 | 2 | 45 | 00000000100100 | 2 | 65 | 00000000100010 | 2 |
| 6 | 00010000100000 | 2 | 26 | 01000000100000 | 2 | 46 | 00010000100100 | 3 | 66 | 01000000100100 | 3 |
| 7 | 00100100000000 | 2 | 27 | 00100100001000 | 3 | 47 | 00100100100100 | 4 | 67 | 00100100100010 | 4 |
| 8 | 01001001000000 | 3 | 28 | 01001001001000 | 4 | 48 | 01001001100100 | 4 | 68 | 01001001000010 | 4 |
| 9 | 10000001000000 | 2 | 29 | 10000001001000 | 3 | 49 | 10000001000100 | 3 | 69 | 10000001000010 | 3 |
| A | 10010001000000 | 3 | 2A | 10010001001000 | 4 | 4A | 10010001000100 | 4 | 6A | 10010001000010 | 4 |
| B | 10001001000000 | 3 | 2B | 10001001001000 | 4 | 4B | 10001001000100 | 4 | 6B | 10001001000010 | 4 |
| C | 01000001000000 | 2 | 2C | 01000001001000 | 3 | 4C | 01000001000100 | 3 | 6C | 01000001000010 | 3 |
| D | 00000001000000 | 1 | 2D | 00000001001000 | 2 | 4D | 00000001000100 | 2 | 6D | 00000001000010 | 2 |
| E | 00010001000000 | 2 | 2E | 00010001001000 | 3 | 4E | 00010001000100 | 3 | 6E | 00010001000010 | 3 |
| F | 00100001000000 | 2 | 2F | 00100001001000 | 3 | 4F | 00100001000100 | 3 | 6F | 00100001000010 | 3 |
| 10 | 10000000100000 | 2 | 30 | 00000100000000 | 1 | 50 | 10000000100100 | 3 | 70 | 10000000100010 | 3 |
| 11 | 10000010000000 | 2 | 31 | 10000100100000 | 3 | 51 | 10000010000100 | 3 | 71 | 10000010000010 | 3 |
| 12 | 10010010000000 | 3 | 32 | 10010010001000 | 4 | 52 | 10010010000100 | 4 | 72 | 10010010000010 | 4 |
| 13 | 00100000100000 | 2 | 33 | 10000100010000 | 3 | 53 | 00100000100100 | 3 | 73 | 00100000100010 | 3 |
| 14 | 01000010000000 | 2 | 34 | 01000010001000 | 3 | 54 | 01000010000100 | 3 | 74 | 01000010000010 | 3 |
| 15 | 00000010000000 | 1 | 35 | 00000010001000 | 2 | 55 | 00000010000100 | 2 | 75 | 00000010000010 | 2 |
| 16 | 00010010000000 | 2 | 36 | 00010010001000 | 3 | 56 | 00010010000100 | 3 | 76 | 00010010000010 | 3 |
| 17 | 00100010000000 | 2 | 37 | 00100010001000 | 3 | 57 | 00100010000100 | 3 | 77 | 00100010000010 | 3 |
| 18 | 01001000010000 | 3 | 38 | 01001000001000 | 3 | 58 | 01001000000100 | 3 | 78 | 01001000000010 | 3 |
| 19 | 10000000010000 | 2 | 39 | 10000000001000 | 2 | 59 | 10000000000100 | 2 | 79 | 00001001001000 | 3 |
| 1A | 10010000010000 | 3 | 3A | 10010000001000 | 3 | 5A | 10010000000100 | 3 | 7A | 10010000000010 | 3 |
| 1B | 10001000010000 | 3 | 3B | 10001000001000 | 3 | 5B | 10001000000100 | 3 | 7B | 10001000000010 | 3 |
| 1C | 01000000010000 | 2 | 3C | 01000000001000 | 2 | 5C | 01000000000100 | 2 | 7C | 01000000000010 | 2 |
| 1D | 00001000010000 | 2 | 3D | 00001000001000 | 2 | 5D | 00001000000100 | 2 | 7D | 00001000000010 | 2 |
| 1E | 00010000010000 | 2 | 3E | 00010000001000 | 2 | 5E | 00010000000100 | 2 | 7E | 00010000000010 | 2 |
| 1F | 00100000010000 | 2 | 3F | 00100000001000 | 2 | 5F | 00100000000100 | 2 | 7F | 00100000000010 | 2 |

| DATA | EFM DATA | NUMBER OF INVERSIONS | DATA | EFM DATA | NUMBER OF INVERSIONS | DATA | EFM DATA | NUMBER OF INVERSIONS | DATA | EFM DATA | NUMBER OF INVERSIONS |
|---|---|---|---|---|---|---|---|---|---|---|---|
| 80 | 01001000100001 | 4 | A0 | 00001000100001 | 3 | C0 | 01000100100000 | 3 | E0 | 01000100000010 | 3 |
| 81 | 10000100100001 | 4 | A1 | 10000100001001 | 4 | C1 | 10000100010001 | 4 | E1 | 00000100000010 | 2 |
| 82 | 10010000100001 | 4 | A2 | 01000100100001 | 3 | C2 | 10010010010000 | 4 | E2 | 10000100010010 | 4 |
| 83 | 10001000100001 | 4 | A3 | 00000100100001 | 3 | C3 | 00001000100100 | 3 | E3 | 00100100000010 | 3 |
| 84 | 01000100100001 | 4 | A4 | 01000100001001 | 4 | C4 | 01000100010001 | 4 | E4 | 01000100100010 | 4 |
| 85 | 00000000100001 | 2 | A5 | 00000100001001 | 3 | C5 | 00000100010001 | 3 | E5 | 00000100100010 | 3 |
| 86 | 00010000100001 | 3 | A6 | 01000000100001 | 3 | C6 | 00010010010000 | 3 | E6 | 01000000100010 | 3 |
| 87 | 00100100100001 | 4 | A7 | 00100100001001 | 4 | C7 | 00100100010001 | 4 | E7 | 00100100100010 | 4 |
| 88 | 01001001000001 | 4 | A8 | 01001001001001 | 5 | C8 | 00001001001000 | 3 | E8 | 10000100000100 | 3 |
| 89 | 10000001000001 | 3 | A9 | 10000001001001 | 4 | C9 | 10000100000001 | 3 | E9 | 10000100000100 | 3 |
| 8A | 10010001000001 | 4 | AA | 10010001001001 | 5 | CA | 00001001001000 | 3 | EA | 00001001001001 | 4 |
| 8B | 10001001000001 | 4 | AB | 10001001001001 | 5 | CB | 00001001000000 | 2 | EB | 00001001000010 | 3 |
| 8C | 01000001000001 | 3 | AC | 01000001001001 | 4 | CC | 01000100000001 | 3 | EC | 01000100000100 | 3 |
| 8D | 00000001000001 | 2 | AD | 00000001001001 | 3 | CD | 00000100000001 | 2 | ED | 00000100000100 | 2 |
| 8E | 00010001000001 | 3 | AE | 00010001001001 | 4 | CE | 00000010010000 | 2 | EE | 00010001000100 | 3 |
| 8F | 00100001000001 | 3 | AF | 00100001001001 | 4 | CF | 00100100000001 | 3 | EF | 00100100000100 | 3 |
| 90 | 10000000100001 | 3 | B0 | 00000100100000 | 2 | D0 | 00000100100100 | 3 | F0 | 00000100100010 | 3 |
| 91 | 10000010000001 | 3 | B1 | 10000010001001 | 4 | D1 | 10000010010001 | 4 | F1 | 10000010010010 | 4 |
| 92 | 10010010000001 | 4 | B2 | 10010010001001 | 5 | D2 | 10010010010001 | 5 | F2 | 10010010010010 | 5 |
| 93 | 00100000100001 | 3 | B3 | 00100010010000 | 3 | D3 | 10000100100000 | 3 | F3 | 00000100100010 | 3 |
| 94 | 01000010000001 | 3 | B4 | 01000010001001 | 4 | D4 | 01000010010001 | 4 | F4 | 01000010010010 | 4 |
| 95 | 00000010000001 | 2 | B5 | 00000010001001 | 3 | D5 | 00000010010001 | 3 | F5 | 00000010010010 | 3 |
| 96 | 00010010000001 | 3 | B6 | 00010010001001 | 4 | D6 | 00010010010001 | 4 | F6 | 00010010010010 | 4 |
| 97 | 00100010000001 | 3 | B7 | 00100010001001 | 4 | D7 | 00100010010001 | 4 | F7 | 00100010010010 | 4 |
| 98 | 01001000000001 | 3 | B8 | 01001000001001 | 4 | D8 | 01001000010001 | 4 | F8 | 01001000010010 | 4 |
| 99 | 10000100010000 | 3 | B9 | 10000000001001 | 3 | D9 | 10000000010001 | 3 | F9 | 10000000010010 | 3 |
| 9A | 10010000000001 | 3 | BA | 10010000001001 | 4 | DA | 10010000010001 | 4 | FA | 10010000010010 | 4 |
| 9B | 10001000000001 | 3 | BB | 10001000001001 | 4 | DB | 10001000010001 | 4 | FB | 10001000010010 | 4 |
| 9C | 01000010010000 | 3 | BC | 01000000001001 | 3 | DC | 01000000010001 | 3 | FC | 01000000010010 | 3 |
| 9D | 00001000000001 | 2 | BD | 00001000001001 | 3 | DD | 00001000010001 | 3 | FD | 00001000010010 | 3 |
| 9E | 00010000000001 | 2 | BE | 00010000001001 | 3 | DE | 00010000010001 | 3 | FE | 00010000010010 | 3 |
| 9F | 00100100010000 | 3 | BF | 00100000001001 | 3 | DF | 00100000010001 | 3 | FF | 00100000010010 | 3 |

ROTATION CONTROL CIRCUIT BASED ON THE MEAN VALUE OF RUN LENGTH CODE GENERATION PATTERNS REPRODUCING APPARATUS EQUIPPED WITH THE ROTATION CONTROL CIRCUIT

BACKGROUND OF THE INVENTION

1. Field of the Invention

The present invention relates to a reproducing apparatus for reproducing information from a disc-type recording medium and, further, to a rotation servo circuit to be mounted on a reproducing apparatus.

2. Description of the Related Art

Systems using disc-type recording media, such as optical discs or magneto-optic discs, are widespread. In such systems, data is modulated in accordance with EFM (eight-fourteen modulation), which is a kind of run length limited code on PCM (pulse code modulation) data. Said modulated data is recorded on discs.

For the disc rotating operation, a CLV (constant linear velocity) system is adopted.

For CLV rotation servo, an EFM signal read from the disc is usually supplied to a PLL (phase locked loop) circuit to generate a clock, which is compared with a reference clock obtained by means of a crystal to thereby obtain rotation error information. The rotation error information thus obtained is fed back to a spindle motor for rotating the disc, whereby a rotating condition in which the linear velocity is constant is attained. In the present specification, a servo circuit of such a construction will be referred to as a "PLL servo circuit".

For the PLL servo circuit to function, it is necessary to secure a condition in which the PLL circuit is locked and in which clocks are correctly extracted. To lock the PLL circuit, a rough servo control for dragging the extracted EFM signal into the capture range of the PLL circuit is required when starting up the spindle motor. That is, in a disc reproducing apparatus, when starting the spindle rotation, a rotation servo control of a predetermined number of revolutions is usually first performed by a rough servo circuit. When the PLL circuit is locked, the CLV servo operation is switched from the rough servo circuit to the PLL servo circuit.

FIG. 1 shows the construction of a CLV servo system in a disc reproducing apparatus.

Numeral 51 indicates a disc, and numeral 52 indicates a spindle motor. Numeral 53 indicates an optical head for reading data from the disc 51. The data read by the optical head 53 is output through an RF amplifier 54 as an EFM signal.

Though not shown, the reproduction system circuit performs EFM demodulation, error correction processing, etc. on the EFM signal to thereby obtain a reproduction signal of audio data, etc.

In the CLV servo system, the EFM signal is supplied to a PLL servo circuit 55 and a rough servo circuit 60.

As stated above, the PLL servo circuit 55 supplies the EFM signal to the PLL circuit to reproduce a clock, which is compared with a reference clock obtained by means of a crystal, thereby obtaining rotation error information (a rotation phase servo signal ECLV-P).

The rotation phase servo signal ECLV-P is supplied to one of two adder circuits 58.

The rough servo circuit 60 detects a maximum or minimum inversion pattern included in the EFM signal, and obtains rotation error information (a rotation speed servo signal ECLV-S) for causing this pattern to have a proper inversion interval or inversion frequency. This rotation speed servo signal ECLV-S is supplied to the S-terminal of a switching circuit 56 and, further, to the other adder circuit 58.

At first, the S-terminal of the switching circuit 58 is selected, so that the rotation speed servo signal ECLV-S is supplied to a motor driver 57. The motor driver 57 supplies the spindle motor 52 with driving electric power in accordance with the rotation speed servo signal ECLV-S.

In the PLL servo circuit 55, in which the PLL circuit is locked during the rough servo period, a lock detection signal "Lock" is output in response to the locking of the PLL circuit and supplied to the switching circuit 56. Upon receiving the lock detection signal "Lock", the P-terminal of the switching circuit 56 is connected and, from this time onward, a signal obtained by adding together the rotation phase servo signal ECLV-P and the rotation speed servo signal ECLV-S is supplied to the motor driver 57, whereby a CLV servo by the operation of the PLL servo circuit 55 is executed.

The rough servo circuit 60 includes an inversion interval measurement section 61, a peak hold circuit 62, a bottom hold circuit 63 and a magnitude comparator 64, and generates the rotation speed servo signal ECLV-S by the following operation.

In an optical disc or a magneto-optic apparatus, an EFM signal extracted in a condition of the normal number of revolutions is composed of 9 kinds of components having an inversion interval of 3T–11T with respect to a reference clock T (T=$\frac{1}{4.3218}$ MHz).

At the forward end of one frame of the EFM signal, two consecutive patterns having an inversion interval of 11T, which is the maximum inversion interval, are encoded. In FIG. 2, which shows the construction of one frame of EFM signal, the foremost 24 bits of one frame, formed of 588 bits, constitutes a sync pattern, which is a fixed pattern of 11T, 11T and 2T, as shown in FIG. 2.

Next to the sync pattern, sub code data, main data consisting of audio data or the like, and parity, each item in 14 bits, are arranged as shown in the drawing. Further, 3-bit margin bits are arranged between the 14-bit data items.

There exist 33 symbols (1 symbol=14 bits) as the main data in one frame; in the case, for example, of audio data, 6 sampling sections are provided with respect to the left and right channels.

Since 588 bits corresponds to 6 sampling sections, the frequency (RF clock) of one frame is 7.35 KHz. The above-mentioned 4.3218 MHz corresponds to the clock of each bit, that is, it is a value of 7.35 KHz×588.

The rough servo circuit 60 performs rough servo by measuring, for example, the pattern width as the maximum inversion interval 11T seen in the sync pattern.

However, since there is a possibility that an inversion interval larger than 11T is detected due to flaws on the disc or the like, there is also provided a function by which such erroneous data can be cancelled.

In the rough servo circuit 60, the EFM signal supplied is first measured for its inversion interval by the inversion interval measuring section 61. The reference clock for the measurement is 1/T.

The inversion interval measured is supplied to the peak hold circuit 62, and the value of an inversion interval which is maximum at an interval of, for example, RF clock (7.35 KHz)/2, is held.

The output of the peak hold circuit 62 is further supplied to the bottom hold circuit 63, and the value of an inversion interval which is minimum at a longer interval of, for example, RF clock (7.35 KHz)/16, is held. The output of the bottom hold circuit 63 is the minimum of the maximum inversion interval values output from the peak hold circuit 62. That is, even if inversion intervals of 11T or more are generated due to flaws on the disc or the like, they will be cancelled, and an inversion interval value in the correct 11T pattern will be output from the bottom hold circuit 63.

The inversion interval value output from the bottom hold circuit 63 is supplied to the magnitude comparator 64. The magnitude comparator 64 is also supplied with an inversion interval value as an 11T pattern serving as a reference, that is, an inversion interval value of 11T pattern in the EFM signal, extracted in the condition of normal number of revolutions, and this value is compared with the inversion interval value output from the bottom hold circuit 63.

The polarity and absolute value obtained through the comparison processing, that is, the error information, is used as a rotation speed servo signal ECLV-S.

However, the rough servo circuit 60 as described above has a problem in that it leads to a large circuit size, resulting in a high cost. Further, it involves a large power consumption.

As described above, to prevent a malfunction caused by the generation of an inversion interval of beyond 11T, attributable to flaws or dirt on the disc, it is necessary to execute a process in which the maximum inversion interval values are peak-held in a certain time width and in which what is obtained by bottom holding the minimum of the peak-held values in a still larger time width is employed as an inversion pattern of the proper maximum interval, with the result that it is rather difficult to attain a reduction in circuit size.

SUMMARY OF THE INVENTION

In view of the above problem, it is an object of the present invention to make it possible to attain a marked reduction in the size of the rough servo circuit.

To solve the above problem, the present invention provides a reproducing apparatus including:

rotating means for rotating a disc-type recording medium;

data extracting means for extracting a run length limited code recorded on said disc-type recording medium;

reference inversion value generating means for generating a reference inversion value representative of an inversion probability pattern of the run length limited code recorded on said disc-type recording medium;

average inversion value detecting means for detecting the average inversion value of the run length limited code extracted from said data extracting means;

comparison means for comparing the reference inversion value from said reference inversion value generating means with the average inversion value from said average inversion value detecting means; and control means for controlling said rotating means in accordance with the comparison result of said comparison means;

rotating means for rotating a disc-type recording medium;

data extracting means for extracting a run length limited code recorded on said disc-type recording medium;

reference inversion value generating means for generating a reference inversion value representative of an inversion probability pattern of the run length limited code recorded on said disc-type recording medium;

average inversion value detecting means for detecting the average inversion value of the run length limited code extracted from said data extracting means;

comparison means for comparing the reference inversion value from said reference inversion value generating means with the average inversion value from said average inversion value detecting means and generating a first rotation servo signal on the basis of the comparison result;

second comparison means for extracting a clock from the run length limited code extracted from said data extracting means, comparing the extracted clock with a predetermined reference clock, and generating a second rotation servo signal on the basis of the comparison result; and control means for controlling the supply of the first rotation servo signal and the second rotation servo signal to the rotating means.

In accordance with the present invention, there is further provided a reproducing apparatus including:

a spindle motor for rotating a disc;

a data detector for extracting a run length limited code recorded on the disc;

a reference inversion value generator for generating a reference inversion value based on the generation pattern of the run length limited code recorded on the disc;

a mean inversion value detector for detecting the mean inversion value of the run length limited code extracted from the data detector;

a first comparator for comparing the reference inversion value from the reference inversion value generator with the mean inversion value from the mean inversion value detector;

a second comparator for extracting a clock from the run length limited code extracted from the data detector and for comparing the extracted clock with a predetermined reference clock;

data extracting means for extracting an input run length limited code;

reference inversion value generating means for generating a reference inversion value representative of an inversion probability pattern of the input run length limited code;

average inversion value detecting means for detecting the average inversion value of the run length limited code extracted from said data extracting means;

comparison means for comparing the reference inversion value from said reference inversion value generating means with the average inversion value from said average inversion value detecting means; and rotation drive signal generating means for generating a rotation drive signal on the basis of the comparison results of said comparison means;

data extracting means for extracting an input run length limited code;

reference inversion value generating means for generating a reference inversion value representative of an inversion probability pattern of the input run length limited code;

average inversion value detecting means for detecting the average inversion value of the run length limited code extracted from said data extracting means;

first comparison means for comparing the reference inversion value from said reference inversion value generating means with the average inversion value from said average inversion value detecting means and generating a first rotation servo signal on the basis of the comparison result;

second comparison means for extracting a clock from the run length limited code extracted from said data extracting means; comparing the extracted clock with a predetermined reference clock, and generating a second rotation servo signal on the basis of the comparison result.

By obtaining the mean value of the inversion intervals of a run length limited code extracted from a disc, it is possible to obtain a mean inversion value which is very resistant to the influence of flaws, stains or the like on the disc. Further, it is actually possible for the circuit for calculating the mean inversion value to be simply formed by a divider.

Further, the mean inversion value obtained from the run length limited code extracted from the disc is compared with the proper mean inversion value, that is, the mean inversion value in the EFM signal extracted in the condition of normal number of rotations and used as the target inversion value, whereby rotation error information can be obtained.

BRIEF DESCRIPTION OF THE DRAWINGS

FIG. 4 is a table showing patterns of EFM data and numbers of inversions corresponding to the patterns.

DETAILED DESCRIPTION OF THE PREFERRED EMBODIMENTS

A reproducing apparatus and rotation servo circuits constituting embodiments of the present invention will now be described with reference to FIGS. 3–5.

Figure 3:
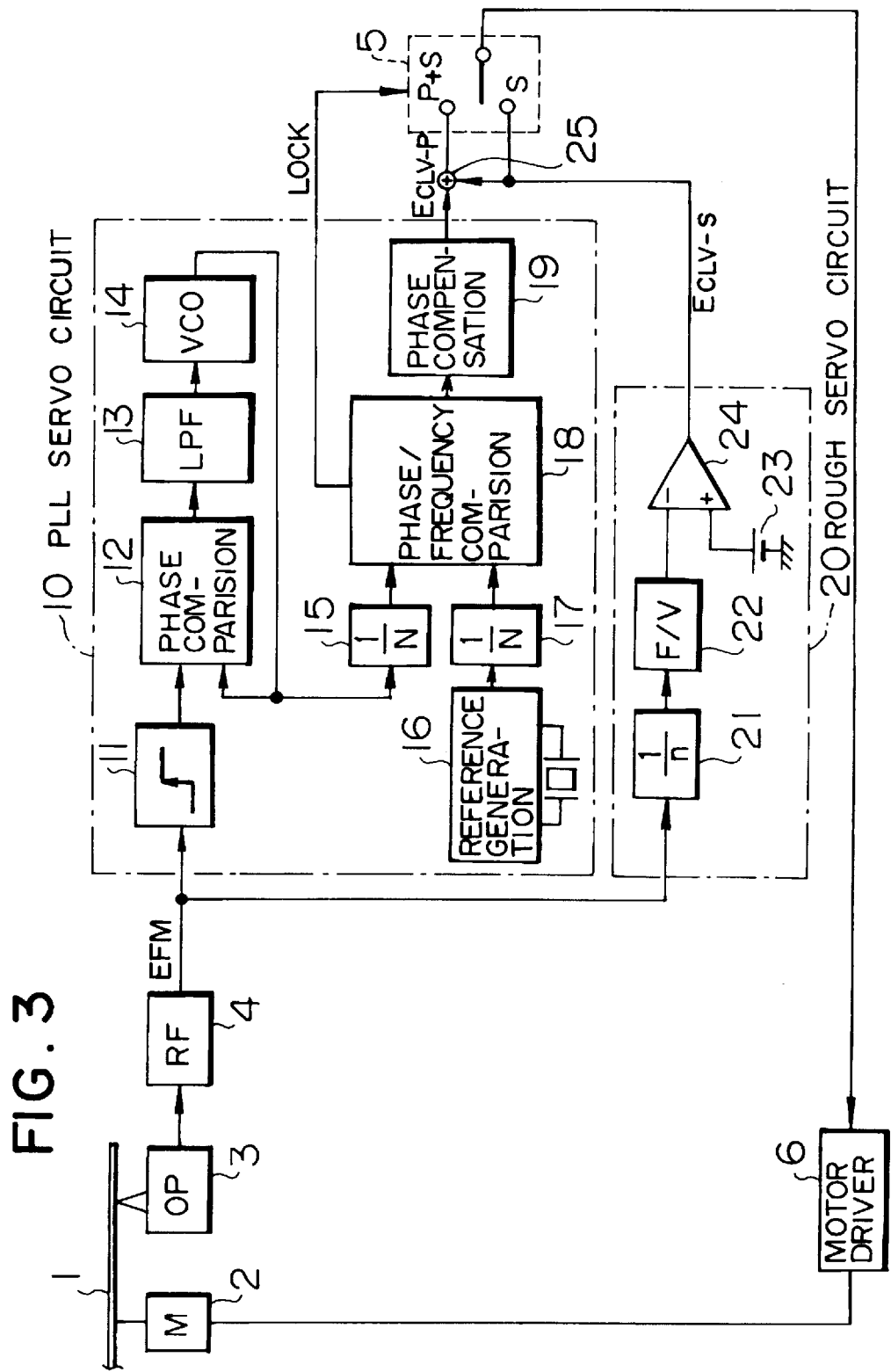
FIG. 3 is a block diagram showing a rotation servo circuit according to the present invention and an optical disc apparatus equipped with the rotation servo circuit.

FIG. 3 is a block diagram showing a CLV servo system of the reproducing apparatus of an embodiment of the present invention and a rotation servo circuit included in the CLV servo system.

Numeral 1 indicates a disc; numeral 2 indicates a spindle motor; and numeral 3 indicates an optical head for reading data from the disc 1.

The data read by the optical head 3 is output through an RF amplifier 4 as an EFM signal.

In the CLV system, the EFM signal is supplied to a PLL servo circuit 10 and a rough servo circuit 20.

In the PLL servo circuit 10, which will be described in detail hereinafter, the EFM signal is input to a PLL circuit to reproduce a clock which is compared with a reference clock obtained by a crystal to thereby obtain a rotation phase error information (a rotation phase servo signal ECLV-P). The rotation phase servo signal ECLV-P is supplied to one of the terminals of an adder 25.

The rough servo circuit 20 detects a mean inversion value with respect to the EFM signal, and compares this mean inversion value with a target inversion value, which is the mean inversion value to be obtained with respect to an EFM signal extracted in the condition of the normal number of revolutions, whereby rotation speed error information (a rotation speed servo signal ECLV-S) is obtained. This rotation speed servo signal ECLV-S is supplied to the S-terminal of a switching circuit 5 and, at the same time, supplied to the other terminal of the adder 25.

At the start up of the spindle motor 2, the S-terminal of the switching circuit 5 is selected, so that the rotation speed servo signal ECLV-S is supplied to the motor driver 6. The motor driver 6 supplies electric power for driving to the spindle motor 2 in accordance with the rotation speed servo signal ECLV-S.

During the rough servo described above, in the PLL servo circuit 10, the PLL circuit is locked and, in response to the locking of the PLL circuit, a lock detection signal Lock is output and supplied to the switching circuit 5. The switching circuit 5 connects the P+S terminal upon being supplied with the lock detection signal Lock. From this time onward, the rotation phase servo signal ECLV-P and the rotation speed servo signal ECLV-S are supplied to the motor driver 6, whereby a CLV servo by the PLL servo circuit 10 is executed.

In the PLL servo circuit 10, an edge detection circuit 11 is first provided to perform edge detection on the EFM signal. The output of the edge detection circuit 11 is supplied to the PLL circuit, which is composed of a phase comparator 12, a low-pass filter 13 and a VCO (voltage control oscillator) 14. Thus, in this PLL circuit, a channel clock component is reproduced from the output of the edge detection circuit 11.

The channel clock, which is the output of the VCO 14, is supplied as another input to the phrase comparator 12 and also 1/N-divided by a divider 15 and input to a phase/frequency comparator 18.

Numeral 16 indicates a reference clock generator based on a crystal. A reference clock from this reference clock generator 16 is 1/N-divided by a divider 17 and input to the phase and frequency comparator 18.

When the PLL circuit, which is formed by the phase comparator 12, the low-pass filter 13 and the VCO 14, is in the locked state, rotation error information is obtained by comparing the channel clock and the reference clock by the phase and frequency comparator 18. The output of the phase and frequency comparator 18 undergoes phase compensation at a phase compensation circuit 19 and is supplied to one of the terminals of an adder circuit 25 as the rotation speed servo signal ECLV-P.

With the locking of the PLL circuit, a lock detection signal Lock is output to the switching circuit 5 from the phase and frequency comparator 18, whereby, in the switching circuit 5, the P+S terminal is connected. As a result, the rotation phase servo signal ECLV-P is supplied to the motor driver 6, and a CLV servo by the operation of the PLL servo circuit 10 is executed.

Until the PLL circuit is thus locked and the PLL servo circuit 10 starts to function, the rough servo circuit 20 functions to effect CLV servo. That is, the rough servo circuit 20 performs control such that the rotation of the spindle motor 2 can drag the EFM signal into the capture range of the PLL circuit.

As shown in FIG. 3, the rough servo circuit 20 is composed of a divider 21, an F/V (frequency/voltage) converter 22, a target voltage generating section 23 and a comparator 24.

The operation of this rough servo circuit 20 will now be described.

First, FIG. 4 shows 256 EFM words (in 14 bits) that are EFM-encoded in correspondence with the original 8-bit data of 0-FF (Hexa decimal data) That is, the diagram is an EFM conversion table.

These EFM words are used as pulse inversion signals of the so-called NRZI (non return to zero inversion) system.

Thus, in each EFM word, the position of "1" represents the position of pulse inversion.

Together with the EFM words, FIG. 4 shows the number of pulse inversions of each of them (that is, the number of times that "1" appears therein).

The 256 EFM words are selected from among 214 patterns possible in 14 bits so as to correspond to 8-bit data. In particular, there are selected those patterns which satisfy the requirement that two or more "0"s should come between "1"s and that, of the inversion intervals (intervals between "1"s), the minimum should be 3T and the maximum 11T.

By classifying the EFM words of FIG. 4 in terms of the number of inversions in a word, the following results are obtained:

The number of EFM words with 1 inversion: 4
The number of EFM words with 2 inversions: 56
The number of EFM words with 3 inversions: 120
The number of EFM words with 4 inversions: 70
The number of EFM words with 5 inversions: 6

From the above, the mean number of inversions in a word is obtained as follows:

$$(4\times1+56\times2+120\times3+70\times4+6\times5)/256=786/256=3.07 \quad (1)$$

Thus, approximately 3 is the average value.

Figure 1:
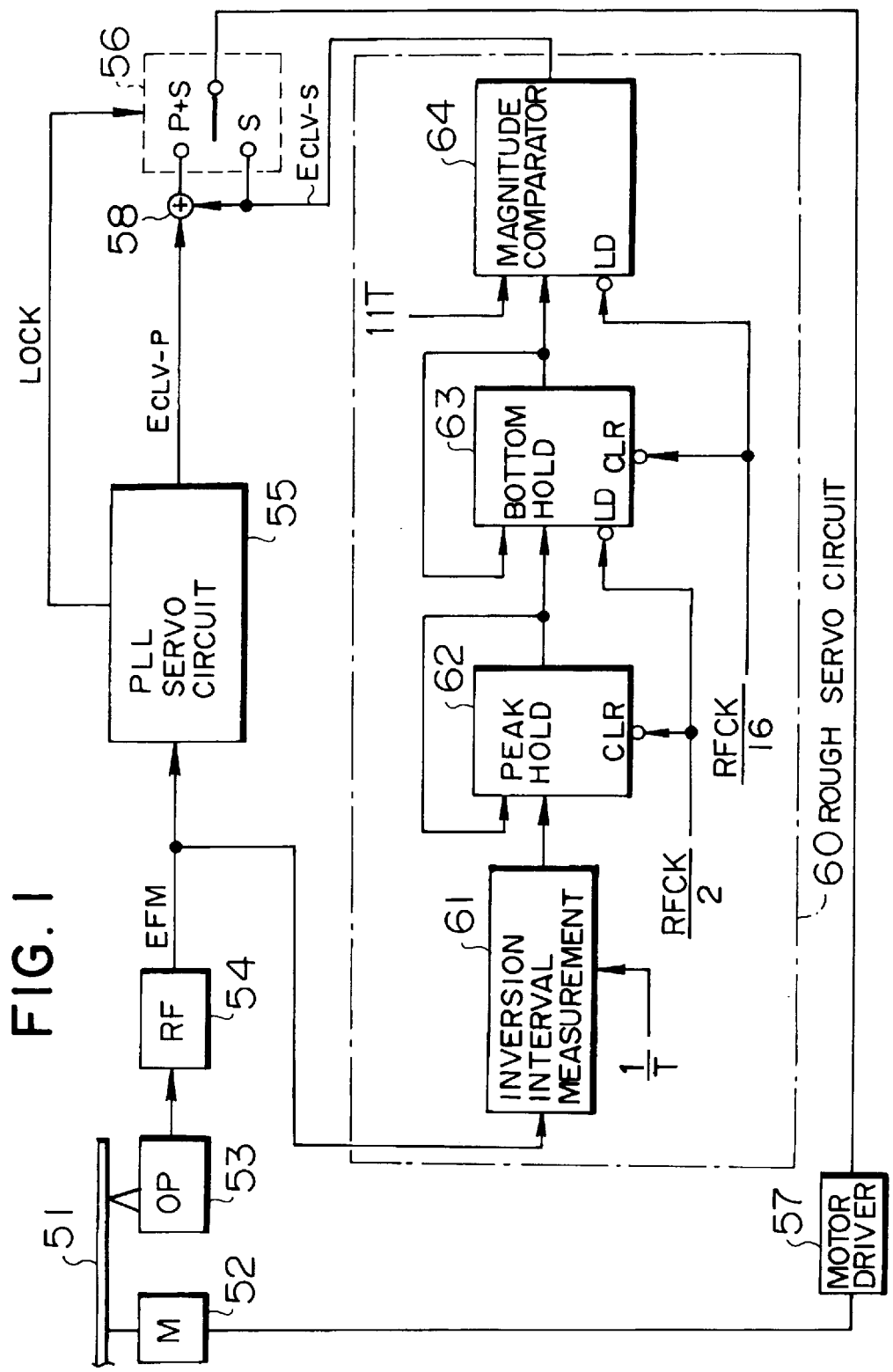
FIG. 1 is a block diagram showing a conventional rotation servo circuit and an optical disc apparatus equipped with the rotation servo circuit.
Figure 2:
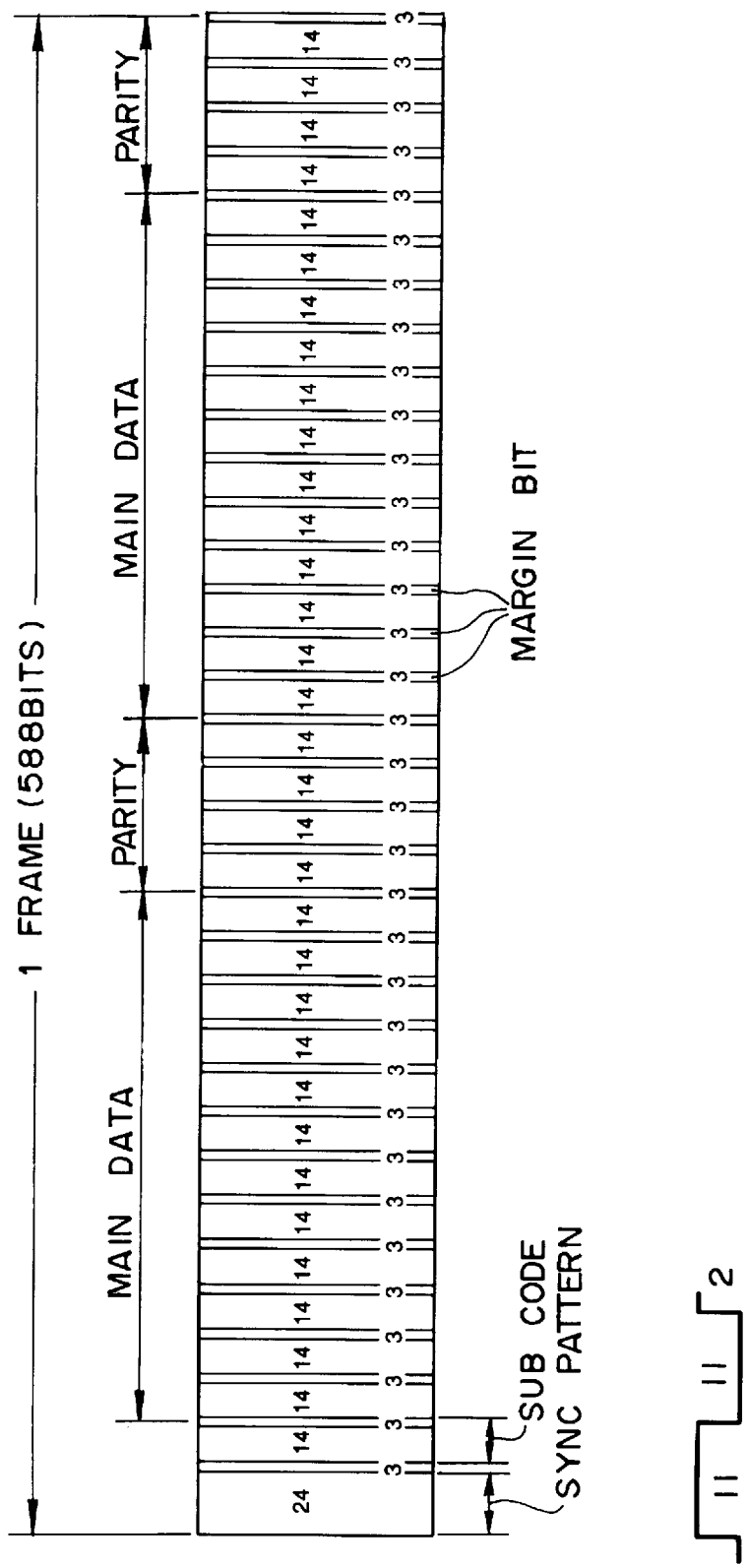
FIG. 2 is a diagram showing the data structure of one frame of an EFM signal recorded on an optical disc.

As explained with reference to FIG. 2, the EFM frame includes a sync pattern of 11T+11T+2T (that is, three inversions) and 3-bit margin bits arranged between the 14-bit EFM words.

Assuming that the EFM-encoded data is a random number, and that the inversion generating ratio in each margin bit is ½, the average number of inversions in one EFM frame is obtained as follows:

$$(786/256)\times33 +(½)\times34+3=121.32[\text{times}] \quad (2)$$

In the above equation (2), "33" is the number of words of the 14-bit data included in one frame; "34" is the number of 3-bit margin-bit words; and "3" is the number of inversions in the sync pattern (See FIG. 2).

It can be concluded from the above that the average frequency of the EFM signal is:

$$(121.32\times7.35[\text{KHz}])/2=445.85 [\text{KHz}]$$

This average frequency of EFM signal is a substantially reliable value in a system in which the PCM audio data constituting the object of EFM modulation is scrambled with M-series data, that is, a system in which the EFM-encoded data is a random number.

It is substantially a proper value although in some cases it more or less lacks reliability as the average frequency of an EFM signal since in an ordinary CD-DA (an optical disc audio uses), the EFM-modulated PCM audio data is not a perfect random number.

When, for example, a division of 1/4096 is effected on an EFM signal having such a average frequency, $$(445.85\times10^3)/4096=108.85[\text{Hz}]$$

Thus, an output frequency of 108.85[Hz] is expected.

In the rough servo circuit 20 of FIG. 3, assuming that n=4096 with respect to the divider 21 for 1/n division, an output frequency of 108.85 Hz is expected as the output of the divider 21 when the spindle motor 2 is in the normal speed condition.

The output frequency of this divider 21 is converted to a voltage value by the F/V (frequency to voltage) converter 22 and supplied to the comparator 24.

Then, from the target voltage generating section 23, a target voltage value is supplied to the comparator 24. The target voltage value is a voltage value corresponding to the frequency of 108.85 Hz.

Thus, in the comparator 24, the voltage value from the F/V converter 22, which corresponds to the average frequency of the EFM signal extracted from the disc 1, and the target voltage value from the target voltage generating section 23, which corresponds to the proper average frequency of the EFM signal, are compared with each other. That is, the output of the comparator 24 is rotation error information.

This information is supplied to the S-terminal of the switching circuit, and to the motor driver 6, whereby rough servo control is effected on the spindle motor 2.

As described above, the rough servo circuit 20 of this embodiment has a very simple circuit configuration, only consisting of the divider 20, the F/V converter 22, the target voltage generating section 23 and the comparator 24. Thus, a remarkable reduction in circuit size is attained as compared to the conventional rough servo circuits.

Further, since the average frequency of an EFM signal is detected, it is possible to realize a highly reliable system which is resistant to the influence of an illegal signal pattern due to flaws, stains, etc. on the disc.

As to the division ratio n of the divider 21, it is not restricted to 4096 but any other suitable value can be set as such. That is, any value can be set as the division ratio n as long as it helps to stabilize the division output to such a degree as to allow it to be kept well within the capture range of the PLL system.

Figure 5:
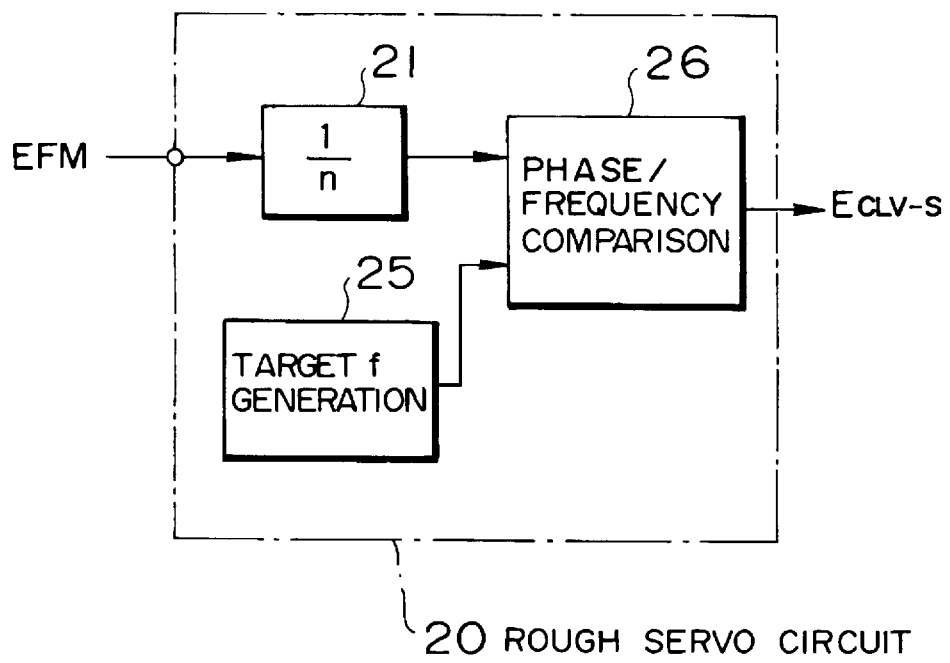
FIG. 5 is a diagram showing a rough servo circuit according to a second embodiment of the present invention.

FIG. 5 shows another embodiment of the rough servo circuit 20.

In this case, the rough servo circuit 20 is composed of the divider 21, a target frequency generating section 27 and a phase and frequency comparing section 26.

In this embodiment, the average frequency obtained from an EFM signal by the divider 21 is not converted to a voltage value but is directly supplied to the phase and frequency comparing section 26. As the target value, a target frequency (108.85 Hz) is supplied from the target frequency generating section 27 to the phase and frequency comparing section 26.

Then, the phase and frequency comparing section 26 compares these input values with each other on a frequency level, and outputs error information, that is, a rotation speed servo signal ECLV-S.

The above construction also provides the same effect.

While the above embodiments have been described with reference to cases in which an EFM signal is used, the present invention is also applicable to any other modulation system as long as it performs data recording by means of a run length limited code.

What is claimed is:

1. A reproducing apparatus comprising:
   rotating means for rotating a disc-type recording medium;
   data extracting means for extracting a run length limited code recorded on said disc-type recording medium;
   reference inversion value generating means for generating a reference inversion value representative of an inversion probability pattern of the run length limited code recorded on said disc-type recording medium;

average inversion value detecting means for detecting the average inversion value of the run length limited code extracted from said data extracting means;

comparison means for comparing the reference inversion value from said reference inversion value generating means with the average inversion value from said average inversion value detecting means; and control means for controlling said rotating means in accordance with the comparison result of said comparison means.

2. A reproducing apparatus according to claim 1, wherein the reference inversion value generated by said reference inversion value generating means is a voltage value.

3. A reproducing apparatus according to claim 1, wherein the reference inversion value generated by said reference inversion value generating means is a frequency value.

4. A reproducing apparatus comprising:

rotating means for rotating a disc-type recording medium;

data extracting means for extracting a run length limited code recorded on said disc-type recording medium;

reference inversion value generating means for generating a reference inversion value representative of an inversion probability pattern of the run length limited code recorded on said disc-type recording medium;

average inversion value detecting means for detecting the average inversion value of the run length limited code extracted from said data extracting means;

first comparison means for comparing the reference inversion value from said reference inversion value generating means with the average inversion value from said average inversion value detecting means and generating a first rotation servo signal on the basis of the comparison result;

second comparison means for extracting a clock from the run length limited code extracted from said data extracting means, comparing the extracted clock with a predetermined reference clock, and generating a second rotation servo signal on the basis of the comparison result; and control means for controlling the supply of the first rotation servo signal and the second rotation servo signal to the rotating means.

5. A reproducing apparatus according to claim 4, wherein the control means further comprises:

addition means for adding together the first rotation servo signal and the second rotation servo signal to output a combined rotation servo signal; and selection means for selecting the first rotation servo signal and the combined rotational servo signal from said addition means.

6. A reproducing apparatus according to claim 5, wherein, for normal rotation, said control means controls said selection means so as to cause it to select the rotation servo signal from said addition means and, for rough servo, said control means controls said selection means so as to cause it to select the rotation servo signal from said first rotation servo signal generating means.

7. A reproducing apparatus according to claim 4, wherein the reference inversion value generated by said reference inversion value generating means is a voltage value.

8. A reproducing apparatus according to claim 4, wherein the reference inversion value generated by said reference inversion value generating means is a frequency value.

9. A rotation servo circuit comprising:

data extracting means for extracting an input run length limited code;

reference inversion value generating means for generating a reference inversion value representative of an inversion probability pattern of the input run length limited code;

average inversion value detecting means for detecting the average inversion value of the run length limited code extracted from said data extracting means;

comparison means for comparing the reference inversion value from said reference inversion value generating means with the average inversion value from said average inversion value detecting means; and rotation drive signal generating means for generating a rotation drive signal on the basis of the comparison results of said comparison means.

10. A rotation servo circuit according to claim 9, wherein the reference inversion value generated by said reference inversion value generating means is a voltage value.

11. A rotation servo circuit according to claim 9, wherein the reference inversion value generated by said reference inversion value generating means is a frequency value.

12. A rotation servo circuit comprising:

data extracting means for extracting an input run length limited code;

reference inversion value generating means for generating a reference inversion value representative of an inversion probability pattern of the input run length limited code;

average inversion value detecting means for detecting the average inversion value of the run length limited code extracted from said data extracting means;

first comparison means for comparing the reference inversion value from said reference inversion value generating means with the average inversion value from said average inversion value detecting means and generating a first rotation servo signal on the basis of the comparison result;

second comparison means for extracting a clock from the run length limited code extracted from said data extracting means; comparing the extracted clock with a predetermined reference clock, and generating a second rotation servo signal on the basis of the comparison result.

13. A reproducing apparatus according to claim 12, further comprising:

addition means for adding together the first rotation servo signal and the second rotation servo signal to output a combined rotation servo signal; and selection means for selecting between the first rotation servo signal and the combined rotation servo signal from said addition means.

14. A rotation servo circuit according to claim 12, wherein the reference inversion value generated by said reference inversion value generating means is a voltage value.

15. A rotation servo circuit according to claim 12, wherein the reference inversion value generated by said reference inversion value generating means is a frequency value.

16. A reproducing apparatus comprising:

a motor for rotating a disc-type recording medium;

a data extractor for extracting a run length limited code recorded on said disc-type recording medium;

a generator for generating a reference inversion value representative of an inversion probability pattern of the run length limited code recorded on said disc-type recording medium;

a detector for detecting the average inversion value of the run length limited code extracted from said data extractor;

a comparator for comparing the reference inversion value from said generator with the average inversion value from said detector; and a controller for controlling said rotating means in accordance with the comparison result of said comparator.

17. A reproducing apparatus comprising:

a motor for rotating a disc-type recording medium;

an extractor for extracting a run length limited code recorded on said disc-type recording medium;

a generator for generating a reference inversion value representative of an inversion probability pattern of the run length limited code recorded on said disc-type recording medium;

an average inversion value detector for detecting the average inversion value of the run length limited code extracted from said extractor;

a first comparator for comparing the reference inversion value from said generator with the average inversion value from said average inversion value detector and generating a first rotation servo signal on the basis of the comparison result;

a second comparator for extracting a clock from the run length limited code extracted from said extractor, comparing the extracted clock with a predetermined reference clock and generating a second rotation servo signal on the basis of the comparison result; and a controller for controlling the supply of the first rotation servo signal and of the second rotation servo signal to the motor.

18. A rotation servo circuit comprising:

an extractor for extracting an input run length limited code;

a generator for generating a reference inversion value representative of an inversion probability pattern of the input run length limited code;

a detector for detecting the average inversion value of the run length limited code extracted from said extractor;

a first comparator for comparing the reference inversion value from said generator with the average inversion value from said detector and generating a first rotation servo signal on the basis of the comparison result;

second comparator for extracting a clock from the run length limited code extracted from said extractor, comparing the extracted clock with a predetermined reference clock and generating a second rotation servo signal on the basis of the comparison result.

19. A rotation servo circuit comprising:

an extractor for extracting an input run length limited code;

a generator for generating a reference inversion value representative of an inversion probability pattern of the input run length limited code;

a detector for detecting the average inversion value of the run length limited code extracted from said extractor;

a comparator for comparing the reference inversion value from said generator with the average inversion value from said detector; and a rotation drive signal generator for generating a rotation drive signal on the basis of the comparison results of said comparator.

* * * * *